(12) United States Patent
Bodke

(10) Patent No.: US 8,479,291 B1
(45) Date of Patent: Jul. 2, 2013

(54) SYSTEMS AND METHODS FOR IDENTIFYING POLYMORPHIC MALWARE

(75) Inventor: Anand Bodke, Pune (IN)

(73) Assignee: Symantec Corporation, Mountain View, CA (US)

( * ) Notice: Subject to any disclaimer, the term of this patent is extended or adjusted under 35 U.S.C. 154(b) by 301 days.

(21) Appl. No.: 12/914,984

(22) Filed: Oct. 28, 2010

(51) Int. Cl.
*G06F 11/00* (2006.01)

(52) U.S. Cl.
USPC .................. 726/23; 726/22; 726/24; 726/25; 726/26; 713/188

(58) Field of Classification Search
USPC ....................... 726/22–26; 713/188
See application file for complete search history.

(56) References Cited

U.S. PATENT DOCUMENTS

| 8,136,162 B2 * | 3/2012 | Akyol et al. ................ 726/24 |
| 2007/0240217 A1 * | 10/2007 | Tuvell et al. ................ 726/24 |
| 2010/0125903 A1 * | 5/2010 | Devarajan et al. .......... 726/15 |

* cited by examiner

*Primary Examiner* — Thanhnga B Truong
(74) *Attorney, Agent, or Firm* — ALG Intellectual Property, LLC

(57) ABSTRACT

A computer-implemented method for identifying polymorphic malware may include identifying a sample of a variant within a polymorphic malware strain. The computer-implemented method may also include identifying a set of filters for identifying the polymorphic malware strain. The computer-implemented method may further include determining that the set of filters incorrectly excludes the sample from being identified as within the polymorphic malware strain. The computer-implemented method may additionally include modifying the set of filters to not exclude the sample from being identified as within the polymorphic malware strain. Various other methods, systems, and computer-readable media are also disclosed.

20 Claims, 6 Drawing Sheets

SYSTEMS AND METHODS FOR IDENTIFYING POLYMORPHIC MALWARE

BACKGROUND

In recent years, authors of malicious software ("malware") have attempted to proliferate malware by generating thousands or potentially millions of variations of a malicious file. For example, a malware author may create a unique version of a malicious file for each intended target by repacking (i.e., compressing, encrypting, and/or otherwise obfuscating) the file on a server before distributing the same. The malware author may even automate this process using a polymorphic packer and/or obfuscator engine. Unfortunately, because many existing antivirus technologies detect malware by detecting or identifying unique digital signatures or fingerprints associated with known-malicious files, malware authors may avoid detection by only distributing new (i.e., unique), repacked versions of malicious files.

In order to detect whether an executable file is a sample of a polymorphic malware strain, anti-virus vendors may create detection routines for decrypting portions of the executable file and locating one or more signatures of the polymorphic malware strain in the decrypted data. Since the application of such detection routines may be computationally expensive, anti-virus engineers may also hand-code initial detection routines for filtering out executable files that are unlikely to represent variants of a polymorphic malware strain. Unfortunately, a polymorphic packer engine may subsequently generate a variant of a polymorphic malware strain that the initial detection routine miscategorizes, requiring anti-virus engineers to spend time rehabilitating or rewriting the initial detection routine. Accordingly, the instant disclosure identifies a need for additional and improved systems and methods for identifying polymorphic malware.

SUMMARY

As will be described in greater detail below, the instant disclosure generally relates to systems and methods for identifying polymorphic malware. Systems and methods described herein may automatically update filters (directed, e.g., towards static properties of an executable file) used when screening executable files for a polymorphic malware strain. These systems and methods may ensure that each new sample of the polymorphic malware strain will be correctly handled by these filters by modifying the filters so that they do not exclude the sample from a classification as a variant of the polymorphic malware strain (e.g., via a subsequent comprehensive scan). For example, a method may include identifying a sample of a variant within a polymorphic malware strain, identifying a set of filters for identifying the polymorphic malware strain, determining that the set of filters incorrectly excludes the sample from being identified as within the polymorphic malware strain, and modifying the set of filters to not exclude the sample from being identified as within the polymorphic malware strain.

The set of filters may include at least one filter based on a static property of an executable file. The static property may include any of a variety of properties, including the size of the executable file, a number of sections in the executable file, a characteristic of a section in the executable file, and/or the number of exported components in the executable file.

The set of filters may be applied in a variety of contexts. For example, scans for polymorphic malware may include multiple stages. The set of filters may be applied to an executable file subject to a scan before a dispositive scan of the executable file (i.e., if the executable file is excluded by the set of filters, then the dispositive scan regarding whether the executable file is a variant of a corresponding malware strain need not occur). In some examples, the dispositive scan may include scanning the executable file for encryption information, decrypting at least a portion of the executable file with the encryption information, and then identifying a signature within the executable file that matches the polymorphic malware strain.

In some examples, the systems described herein may only modify the set of filters upon determining that the set of filters nearly correctly categorized the sample. For example, the systems described herein may determine that a substantial proportion of filters within the set of filters correctly identify the sample as within the polymorphic malware strain. Modifying the set of filters may include identifying a minimal change to the scope of the filters necessary to identify the sample as within the polymorphic malware strain.

The polymorphic malware strain may include a server-side polymorphic malware strain. In some examples, after modifying the set of filters, the systems described herein may transmit the modified set of filters to at least one client system (e.g., so that the client system may use the modified set of filters in future scans in order to correctly detect the variant).

Another method (e.g., performed by a client-side computing system) may include identifying an executable file subject to a scan for polymorphic malware; identifying a set of initial filters to apply to the executable file, the set of initial filters having been modified after determining that the set of initial filters incorrectly excluded a sample from being identified as within a polymorphic malware strain; applying the set of filters to the executable file; and then performing a security action on the executable file based at least in part on a result of applying the set of initial filters to the executable file.

In some examples, identifying the executable file may include determining that the executable file is newly created and/or newly downloaded (e.g., from an open and/or untrusted network, such as the Internet). The security action may include performing a dispositive scan on the executable file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
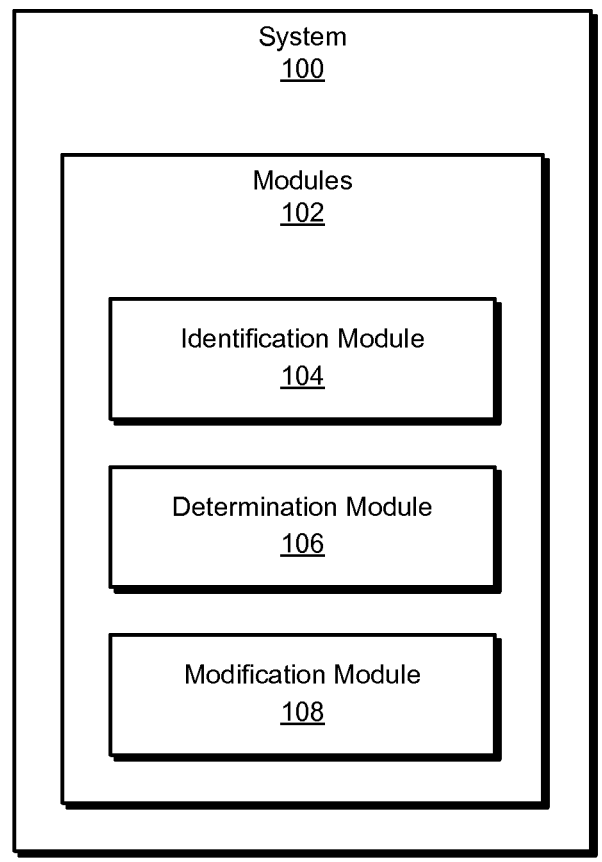
FIG. 1 is a block diagram of an exemplary system for identifying polymorphic malware.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for identifying polymorphic malware. Systems and methods described herein may automatically update filters (directed, e.g., towards static properties of an executable file) used when screening executable files for a polymorphic malware strain. These systems and methods may ensure that each new sample of the polymorphic malware strain will be correctly handled by these filters by modifying the filters so that they do not exclude the sample from a classification as a variant of the polymorphic malware strain (e.g., via a subsequent comprehensive scan).

By automatically updating filters based on new samples of a polymorphic malware strain, these systems and methods may help to ensure that the polymorphic malware strain is accurately identified without requiring a dispositive scan for each executable file. These systems and methods may also relieve a potentially overwhelming burden from anti-virus engineers to rewrite or rehabilitate detection routines in response to each automatically-generated variant of the polymorphic malware strain.

Figure 2:
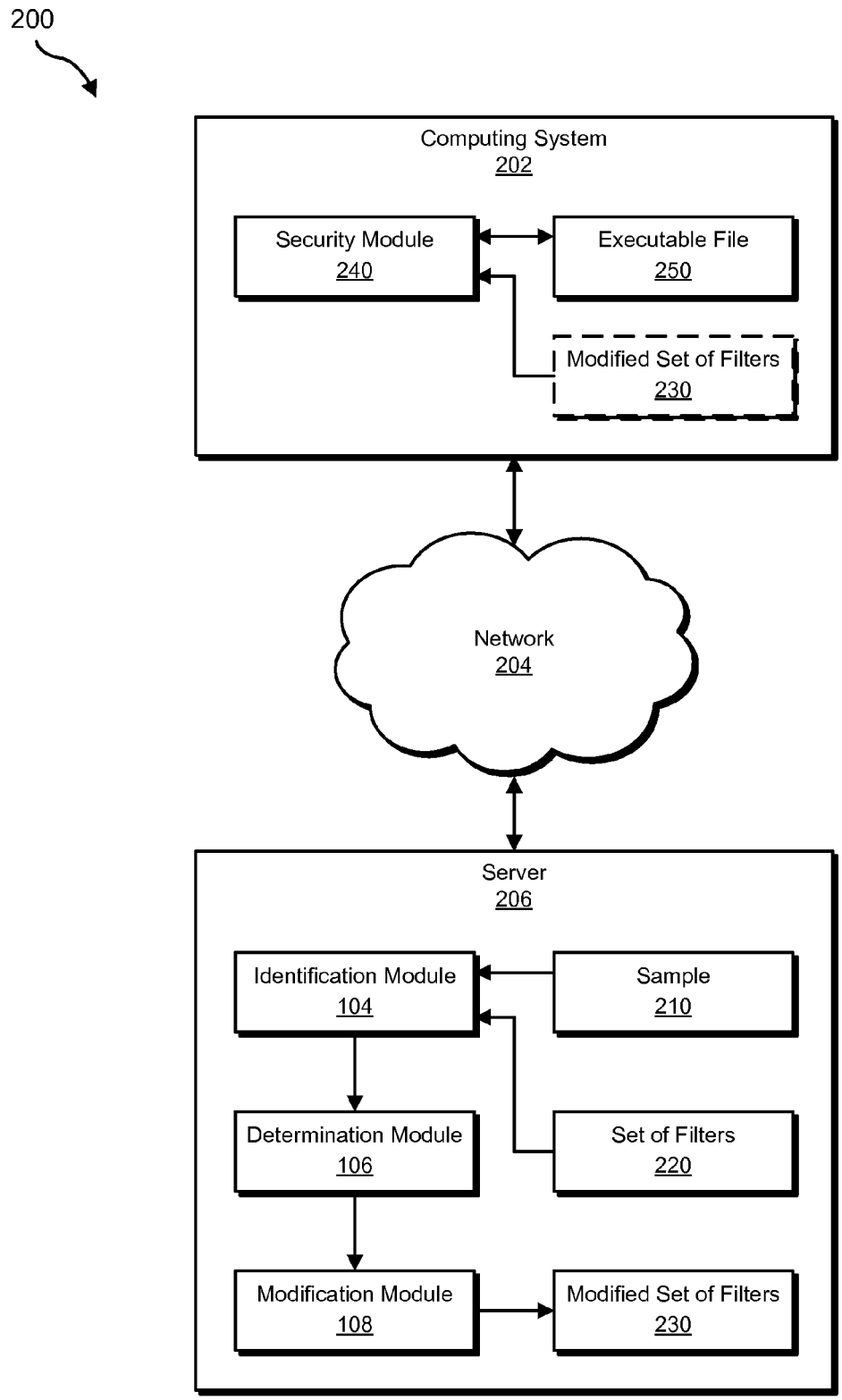
FIG. 2 is a block diagram of another exemplary system for identifying polymorphic malware.

The following will provide, with reference to FIGS. 1-2, detailed descriptions of exemplary systems for identifying polymorphic malware. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for identifying polymorphic malware. As illustrated in this figure, exemplary system 100 may include one or more modules 102 for performing one or more tasks. For example, and as will be explained in greater detail below, exemplary system 100 may include an identification module 104 programmed to identify a sample of a variant within a polymorphic malware strain and identify a set of filters for identifying the polymorphic malware strain. Exemplary system 100 may also include a determination module 106 programmed to determine that the set of filters incorrectly excludes the sample from being identified as within the polymorphic malware strain.

In addition, and as will be described in greater detail below, exemplary system 100 may include a modification module 108 programmed to modify the set of filters to not exclude the sample from being identified as within the polymorphic malware strain. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a server 206 via a network 204. Server 206 may be programmed to perform one or more malware detection services for computing system 202. In one embodiment, and as will be described in greater detail below, server 206 may include identification module 104, determination module 106, and modification module 108.

Identification module 104 may be programmed to identify a sample 210 of a variant of a polymorphic malware strain. Identification module 104 may also be programmed to identify a set of filters 220 for identifying the polymorphic malware strain. Determination module 106 may be programmed to determine that set of filters 220 incorrectly excludes sample 210 from being identified as within the polymorphic malware strain. Modification module 108 may be programmed to modify set of filters 220 (e.g., resulting in a modified set of filters 230) to not exclude sample 210 from being identified as within the polymorphic malware strain.

In one embodiment, computing system 202 may include a security module 240. Security module 240 may be programmed to identify an executable file 250 subject to a scan for polymorphic malware. Security module 240 may also be programmed to identify a modified set of filters 230 to apply to the executable file. Security module 240 may additionally be programmed to apply modified set of filters 230 to executable file 250. Security module 240 may also be programmed to perform a security action on executable file 250 based at least in part on a result of applying modified set of initial filters 230 to executable file 250.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of reading computer-executable instructions. Examples of server 206 include, without limitation, anti-virus servers, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing system 202 and server 206.

Figure 3:
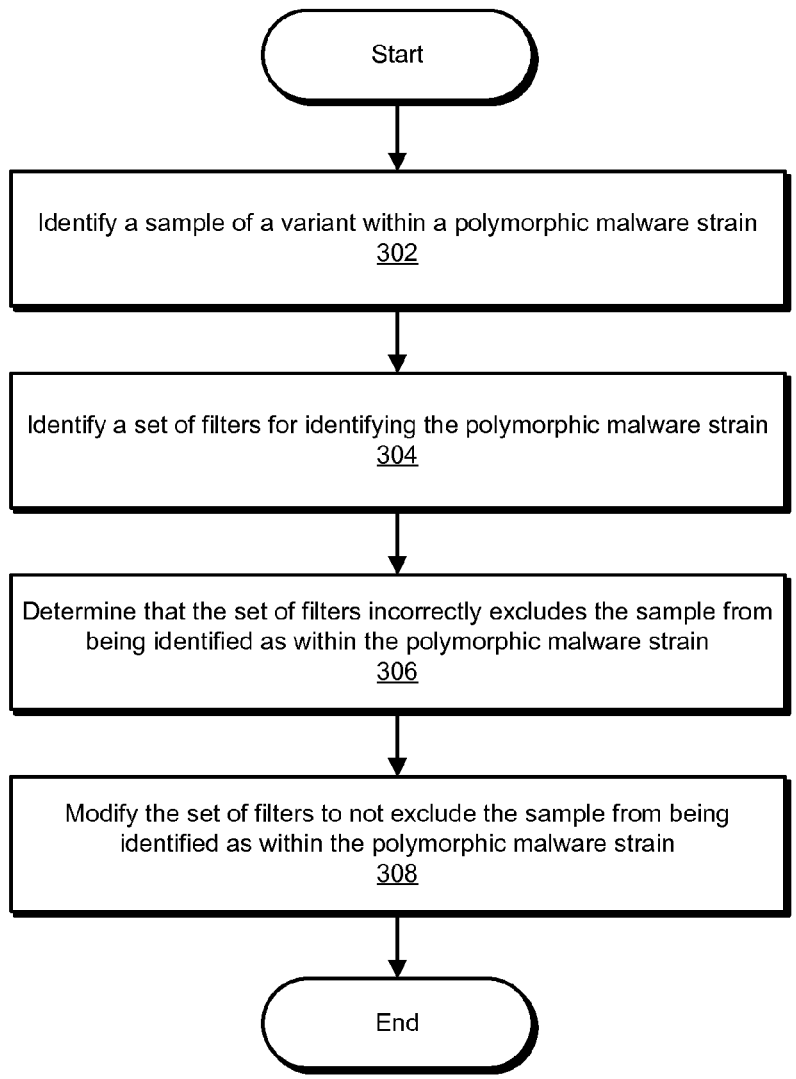
FIG. 3 is a flow diagram of an exemplary method for identifying polymorphic malware.

FIG. 3 is a flow diagram of an exemplary computer-implemented method 300 for identifying polymorphic malware. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a sample of a variant within a polymorphic malware strain. For example, at step 302 identification module 104 may, as part of server 206 in FIG. 2, identify sample 210.

As used herein, the phrase "polymorphic malware strain" may refer to any class of malware that exists in multiple variants (e.g., created by a polymorphic engine), where each variant possesses the same functionality, uses the same underlying algorithms, and/or is generated based on a modification of another variant in the strain.

Identification module 104 may identify the sample in a variety of ways. For example, identification module 104 may receive the sample from a client system. Additionally or alternatively, identification module 104 may identify the sample in a malware database. In some examples, identification module 104 may download the sample from a malicious network location.

The polymorphic malware strain may include a server-side polymorphic malware strain. As used herein, the phrase "server-side polymorphic malware strain" may refer to any polymorphic malware strain whose variants are generated, at least in part, without a polymorphic engine within the malware. For example, a polymorphic engine may reside on a server that distributes the polymorphic malware, creating new variants of the polymorphic malware strain. In some examples, anti-virus vendors may not have access to the polymorphic engine as it may not be found in any samples of the polymorphic malware strain. Accordingly, anti-viruses vendors may be unable to predict future variants of the polymorphic malware strain.

In some examples, identification module 104 may identify the sample as within the polymorphic malware strain. For example, identification module 104 may identify the sample as within the polymorphic malware strain based on the source of the sample (e.g., a uniform resource locator that historically has linked to variants of the polymorphic malware strain). Additionally or alternatively, identification module 104 may identify the sample as within the polymorphic malware strain by performing a verifying scan on the sample. In some examples, identification module 104 may identify the sample as within the polymorphic malware strain by reading a classification associated with the polymorphic malware strain (e.g., provided by an anti-virus engineer).

At step 304 one or more of the systems described herein may identify a set of filters for identifying the polymorphic malware strain. For example, at step 304 identification module 104 may, as part of server 206 in FIG. 2, identify set of filters 220.

As used herein, the term "filter" may refer to any criterion, formula, function, metric, and/or algorithm for filtering and/or classifying input. A "set of filters" may refer to one or more filters in isolation and/or in combination.

Identification module 104 may identify the set of filters in any suitable manner. For example, identification module 104 may query a database using an identifier of the polymorphic malware strain and receive the set of filters in response.

In some examples, the set of filters may include a set of initial filters applied to an executable file subject to a scan before a dispositive scan of the executable file. For example, by applying the set of filters to executable files, an anti-virus scanner may exclude most benign executable files while consuming few computing resources in the process. The anti-virus scanner may then perform more resource-intensive scans on any executable file that was not excluded.

Generally, the dispositive scan may include any scan or set of scans designed to determine the disposition of an executable file after the set of initial filters has been applied to the executable file. In some examples, the dispositive scan may include scanning the executable file for encryption information, decrypting at least a portion of the executable file with the encryption information, and/or identifying a signature within the executable file that matches the polymorphic malware strain. The encryption information may include any information relevant to decrypting and/or reversing the obfuscation of the contents of the executable file. Identifying the signature may include any string matching, expression matching, and/or other pattern matching to determine that the executable file falls within the polymorphic malware strain.

The set of filters may be based on a variety of properties of an executable file. In some examples, the set of filters may include at least one filter based on a static file property of an executable file. As used herein, the phrase "executable file" may refer to any executable file and/or object. For example, "executable file" may refer to a file of the portable executable format. Furthermore, as used herein, the phrase "static file property" may refer to any property of an executable file beyond its particular instructions. In some examples, a "static file property" may refer to a structural property of the executable file. Additionally or alternatively, a "static file property" may refer to a property of executable files that are unlikely to change across variants of a polymorphic malware strain. For example, the static file property may include the size of the executable file (e.g., as an exact number of bytes and/or as a range of sizes). In another example, the static file property may include a number of sections in the executable file (e.g., .text, .data, .rodata, .bss, etc.). The static file property may also include at least one characteristic of at least one section in the executable file, such as the size of a certain section, the location of a certain section, the existence of a marker at the beginning or end of a certain section, etc. The static property may also include the number of exported components in the executable file.

Additional examples of the static file property may include the file alignment of the executable file (e.g., the alignment size, whether the alignment is below 512 bytes, etc.), the existence of certain sections (e.g., a debug section, a resource section, etc.), the linker version, the number of functions imported from certain DLLs, section alignments, etc.

At step 306 one or more of the systems described herein may determine that the set of filters incorrectly excludes the sample from being identified as within the polymorphic malware strain. For example, at step 306 determination module 106 may, as part of server 206 in FIG. 2, determine that set of filters 220 incorrectly excludes sample 210 from being identified as within the polymorphic malware strain.

Determination module 106 may perform step 306 in any suitable manner. For example, determination module 106 may apply the set of filters to the sample, which may exclude the sample as a potential variant of the polymorphic malware strain, and yet verify through another means (e.g., by scanning the sample, looking up the sample in a database, etc.) that the sample is a variant of the polymorphic malware strain.

In some examples, determination module 106 may determine that a substantial proportion of filters within the set of filters correctly identify the sample as within the polymorphic malware strain. For example, the set of filters may include five filters, each of which must match the sample in order to classify the sample as a potential variant of the polymorphic malware strain. However, in this example, only four of the filters may match the sample. Determination module 106 may accordingly conclude that the set of filters may be modified to accommodate the sample without unduly disrupting the efficacy of the set of filters (e.g., as applied to other variants of the polymorphic malware strain). Additionally or alternatively, determination module 106 may examine how close a filter was to correctly categorizing the sample. Using the above example, if the fifth filter specifies that variants of the polymorphic malware strain are between 10 and 20 bytes in file size, and the sample is 22 bytes in file size, determination module 106 may determine that the fifth filter may be modified because 22 bytes is nearly within the range of 10 to 20 bytes.

At step 308 one or more of the systems described herein may modify the set of filters to not exclude the sample from being identified as within the polymorphic malware strain. For example, at step 308 modification module 108 may, as part of server 206 in FIG. 2, modify set of filters 220 to not excludes sample 210, resulting in modified set of filters 230.

Modification module 108 may perform step 308 in a variety of ways. In some examples, modification module 108 may remove from the set of filters one or more filters that excluded the sample. Additionally or alternatively, modification module 108 may modify one or more filters that excluded the sample. In some examples, modification module 108 may replace one or more filters with a new filter that includes the sample as well as all other known variants of the polymorphic malware strain.

In some examples, modification module 108 may identify a minimal change to the scope of the filters necessary to identify the sample as within the polymorphic malware strain. Using an earlier example, if a filter in the set of filters specifies that variants of the polymorphic malware strain are between 10 and 20 bytes in file size, and the sample is 22 bytes in file size, modification module 108 may modify that filter to specify that variants of the polymorphic malware strain are between 10 and 22 bytes in file size. In some examples, modification module 108 may modify the set of filters such that the set of filters is as narrow in scope as possible while still broad enough to include each known variant of the polymorphic malware strain. After step 308, method 300 may terminate.

In some examples, one or more of the systems described herein may transmit the modified set of filters to at least one client system. For example, once modification module 108 has modified the set of filters, it may transmit the modified set of filters to each client system in a database of client systems. These client systems may then use the modified set of filters to identify variants of the polymorphic malware strain. Using FIG. 2 as an example, modification module 108 may transmit modified set of filters 230 to computing system 202.

Figure 4:
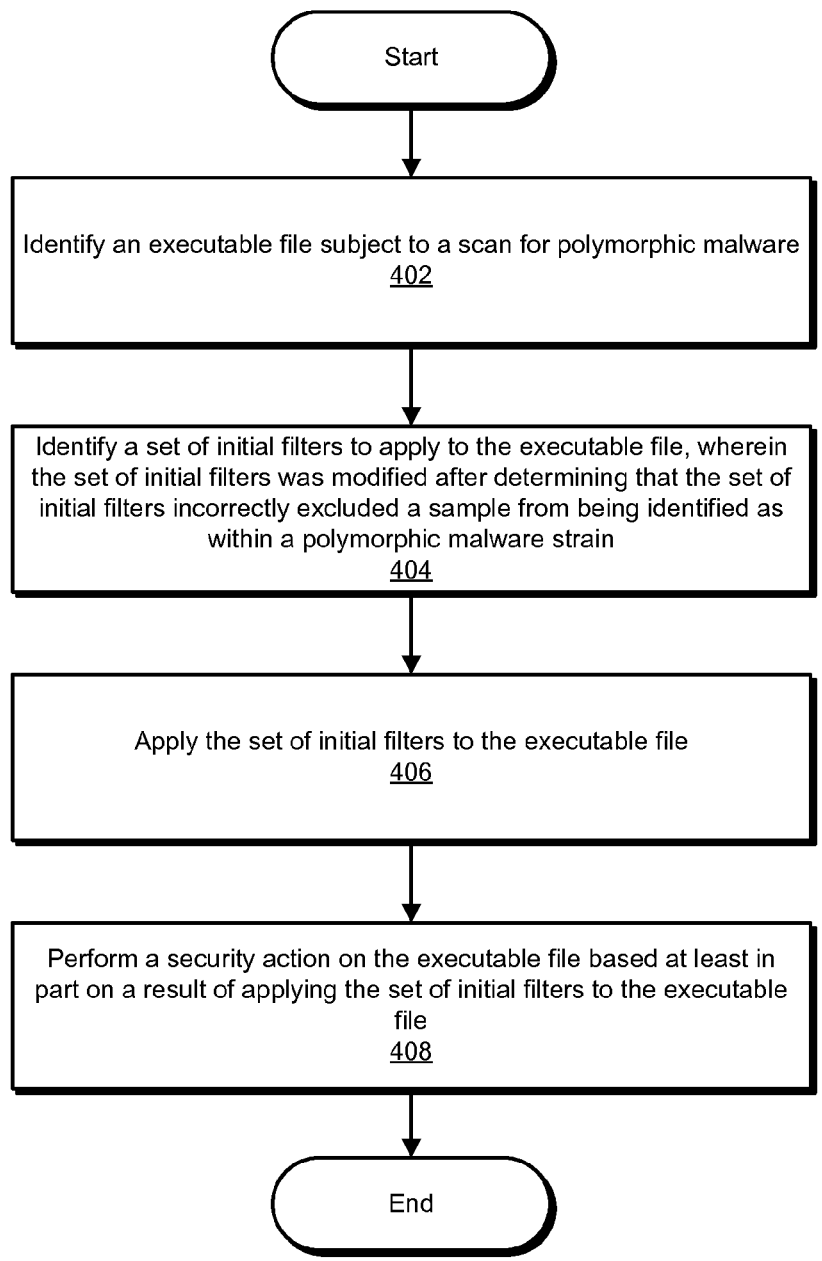
FIG. 4 is a flow diagram of another exemplary method for identifying polymorphic malware.

FIG. 4 is a flow diagram of an exemplary computer-implemented method 400 for identifying polymorphic malware. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

As illustrated in FIG. 4, at step 402 one or more of the systems described herein may identify an executable file subject to a scan for polymorphic malware. For example, at step 402 security module 240 may, as part of computing system 202 in FIG. 2, identify executable file 250.

Security module 240 may perform step 402 in any suitable manner. For example, security module 240 may identify the executable file during a system-wide scan. Additionally or alternatively, security module 240 may identify the executable file as a newly created executable file and/or as a newly downloaded executable file (e.g., from an untrusted and/or unverified website). By limiting the systems and methods described herein to newly created and/or newly downloaded executable files, the systems and methods described herein may provide protection against the polymorphic malware strain while preventing unnecessary file scans.

At step 404 one or more of the systems described herein may identify a set of initial filters to apply to the executable file, the set of initial filters having been modified after determining that the set of initial filters incorrectly excluded a sample from being identified as within a polymorphic malware strain. For example, at step 404 security module 240 may, as part of computing system 202 in FIG. 2, identify modified set of filters 230 to apply to executable file 250.

Security module 240 may perform step 404 in any suitable manner. For example, security module 240 may identify the set of initial filters by receiving the set of initial filters from an anti-virus server (e.g., from server 206 in FIG. 2). Generally, the modification of the set of initial filters may reflect any of the methods and/or features discussed earlier with respect to method 300.

At step 406 one or more of the systems described herein may apply the set of initial filters to the executable file. For example, at step 406 security module 240 may, as part of computing system 202 in FIG. 2, apply modified set of filters 230 to apply to executable file 250.

Security module 240 may perform step 406 in any suitable manner. For example, security module 240 may perform a basic scan of the executable file to gather information referenced by the set of initial filters. Security module 240 may then compare the information to the limits dictated by the set of initial filters. In some examples, the set of initial filters may include executable code designed to autonomously evaluate an executable file. In these examples, security module 240 may simply execute the executable code (e.g., using the executable file as an input).

At step 408 one or more of the systems described herein may perform a security action on the executable file based at least in part on a result of applying the set of initial filters to the executable file. For example, at step 408 security module 240 may, as part of computing system 202 in FIG. 2, perform a security action on executable file 250.

Security module 240 may perform a variety of security actions in response to the result. For example, security module 240 may perform one or more additional scans on the executable file. In some examples, security module 240 may perform a dispositive scan on the executable file. This dispositive scan may share any of the methods and/or features of the dispositive scan described earlier with reference to method 300. Additionally or alternatively, the security action may include quarantining the executable file, transmitting the executable file to an anti-virus server as a sample, and/or notifying a user and/or administrator. After step 408, method 400 may terminate.

Figure 5:
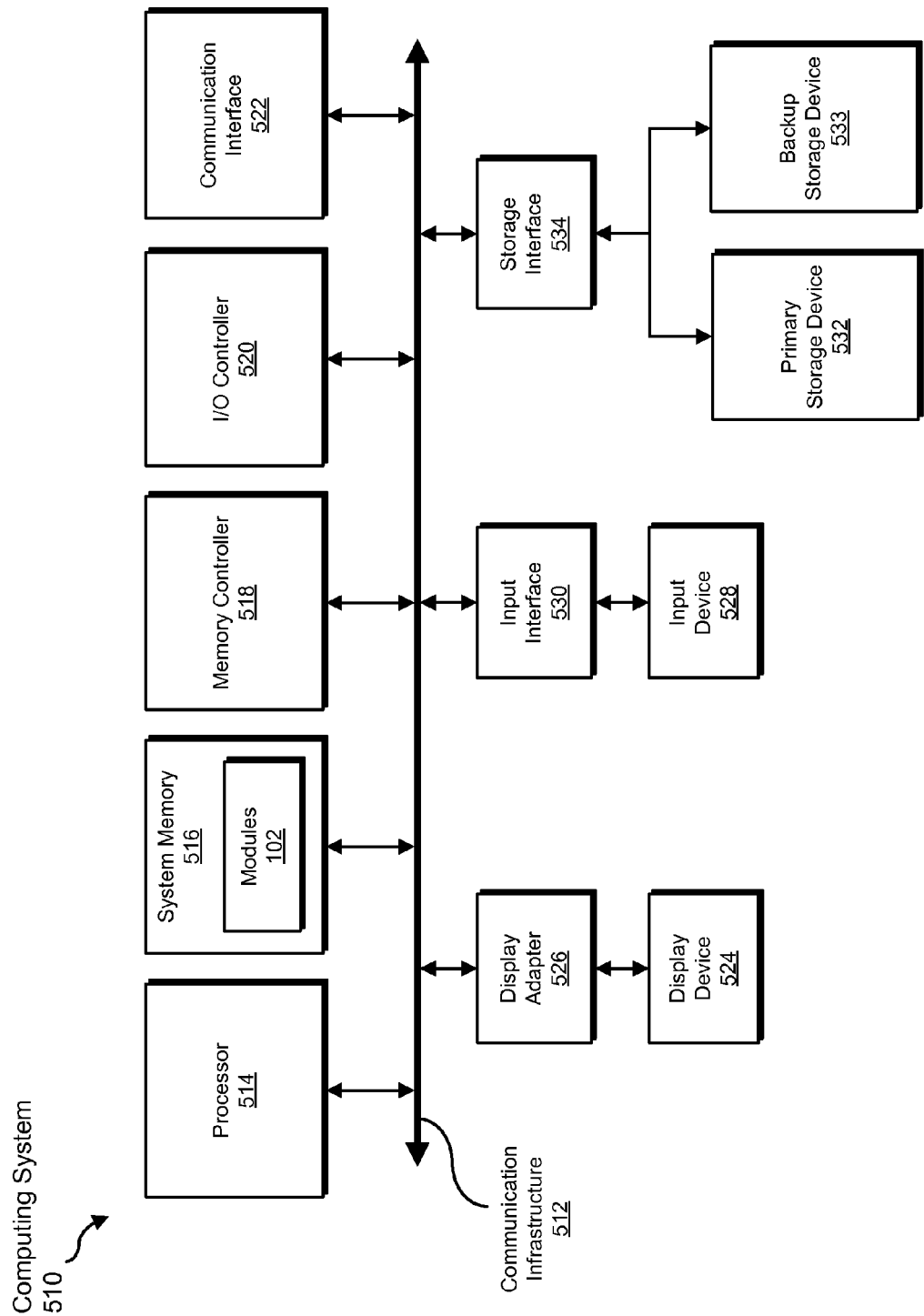
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, scanning, decrypting, determining, modifying, transmitting, applying, and/or performing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, scanning, decrypting, determining, modifying, transmitting, applying, and/or performing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, scanning, decrypting, determining, modifying, transmitting, applying, and/or performing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, scanning, decrypting, determining, modifying, transmitting, applying, and/or performing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, scanning, decrypting, determining, modifying, transmitting, applying, and/or performing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, scanning, decrypting, determining, modifying, transmitting, applying, and/or performing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
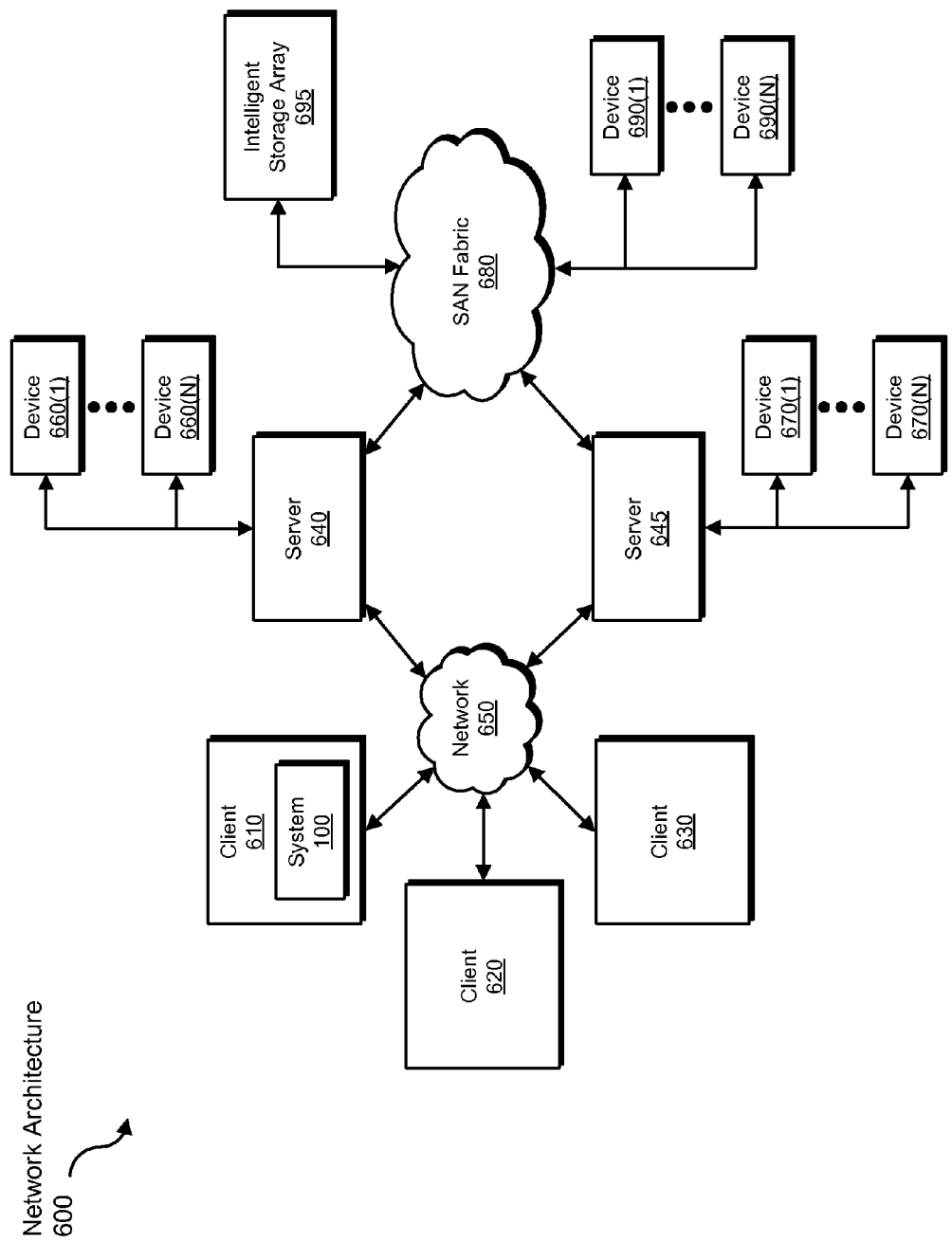
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, scanning, decrypting, determining, modifying, transmitting, applying, and/or performing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for identifying polymorphic malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform an anti-virus system into a more effective anti-virus system. As another example, one or more of the modules described herein may transform a set of filters for identifying a polymorphic malware strain into a more accurate set of filters for identifying the polymorphic malware strain.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for identifying polymorphic malware, the method comprising:
   identifying a sample of a variant within a polymorphic malware strain;
   identifying a set of filters for identifying the polymorphic malware strain;
   determining that the set of filters incorrectly excludes the sample from being identified as within the polymorphic malware strain in response to at least one of:
      determining that the set of filters excludes the sample from being identified as within the polymorphic malware strain and a proportion of filters within the set of filters identify the sample as within the polymorphic malware strain, and/or
      examining how close the set of filters is to correctly categorizing the sample;
   modifying the set of filters to not exclude the sample from being identified as within the polymorphic malware strain,
   wherein at least a portion of the method is being performed by a computing device comprising at least one processor.

2. The computer-implemented method of claim 1, wherein the polymorphic malware strain comprises a server-side polymorphic malware strain.

3. The computer-implemented method of claim 1, wherein the set of filters comprises at least one filter based on a static file property of an executable file.

4. The computer-implemented method of claim 3, wherein the static file property comprises at least one of:
   the size of the executable file;
   a number of sections in the executable file;
   at least one characteristic of at least one section in the executable file;
   the number of exported components in the executable file.

5. The computer-implemented method of claim 4, wherein determining that a filter based on executable file size incorrectly excludes the sample from being identified as within the polymorphic malware strain comprises determining that the size of the executable file of the sample is approximately within a range of sizes specified by the filter based on executable file size.

6. The computer-implemented method of claim 1, wherein determining that the set of filters incorrectly excludes the sample comprises examining how close the set of filters is to correctly categorizing the sample.

7. The computer-implemented method of claim 1, wherein determining that the set of filters incorrectly excludes the sample comprises determining that the set of filters excludes the sample from being identified as within the polymorphic malware strain and the proportion of filters within the set of filters correctly identify the sample as within the polymorphic malware strain.

8. The computer-implemented method of claim 7, wherein determining that the proportion of filters within the set of filters correctly identify the sample comprises determining that a substantial proportion of filters within the set of filters correctly identify the sample.

9. The computer-implemented method of claim 1, wherein modifying the set of filters to not exclude the sample comprises identifying a minimal change to the scope of the filters necessary to identify the sample as within the polymorphic malware strain.

10. The computer-implemented method of claim 1, further comprising transmitting the modified set of filters to at least one client system.

11. A computer-implemented method for identifying polymorphic malware, the method comprising:
identifying an executable file subject to a scan for polymorphic malware;
identifying a set of initial filters to apply to the executable file, wherein the set of initial filters was modified after determining that the set of initial filters incorrectly excluded a sample from being identified as within a polymorphic malware strain in response to at least one of:
determining that the set of filters excluded the sample from being identified as within the polymorphic malware strain and a proportion of filters within the set of filters identified the sample as within the polymorphic malware strain, and/or
examining how close the set of filters was to correctly categorizing the sample;
applying the set of initial filters to the executable file;
performing a security action on the executable file based at least in part on a result of applying the set of initial filters to the executable file,
wherein at least a portion of the method is being performed by a computing device comprising at least one processor.

12. The computer-implemented method of claim 11, wherein the security action comprises performing a dispositive scan on the executable file.

13. A system for identifying polymorphic malware, the system comprising:
an identification module programmed to:
identify a sample of a variant within a polymorphic malware strain;
identify a set of filters for identifying the polymorphic malware strain;
a determination module programmed to determine that the set of filters incorrectly excludes the sample from being identified as within the polymorphic malware strain in response to at least one of:
determining that the set of filters excludes the sample from being identified as within the polymorphic malware strain and a proportion of filters within the set of filters identify the sample as within the polymorphic malware strain, and/or
examining how close the set of filters is to correctly categorizing the sample;
a modification module programmed to modify the set of filters to not exclude the sample from being identified as within the polymorphic malware strain;
at least one hardware processor configured to execute the identification module, the determination module, and the modification module.

14. The system of claim 13, wherein the polymorphic malware strain comprises a server-side polymorphic malware strain.

15. The system of claim 13, wherein the set of filters comprises at least one filter based on a static file property of an executable file.

16. The system of claim 15, wherein the static file property comprises at least one of:
the size of the executable file;
a number of sections in the executable file;
at least one characteristic of at least one section in the executable file;
the number of exported components in the executable file.

17. The system of claim 16, wherein:
the determination module is programmed to determine that a filter based on the size of the executable file size incorrectly excludes the sample from being identified as within the polymorphic malware strain, and
the size of the executable file of the sample is approximately within a range of sizes specified by the filter based on the executable file size.

18. The system of claim 13, wherein the determination module is programmed to determine that the set of filters incorrectly excludes the sample by examining how close the set of filters is to correctly categorizing the sample.

19. The system of claim 13, wherein the determination module is programmed to determine that the set of filters incorrectly excludes the sample by determining that the set of filters excludes the sample from being identified as within the polymorphic malware strain and the proportion of filters within the set of filters correctly identify the sample as within the polymorphic malware strain.

20. The system of claim 13, wherein the modification module is programmed to modify the set of filters to not exclude the sample by identifying a minimal change to the scope of the filters necessary to identify the sample as within the polymorphic malware strain.

* * * * *